Nov. 7, 1961  A. SOMLYODY  3,008,067
COUNTER CIRCUIT AND COUNT INDICATOR
Filed July 2, 1959

INVENTOR.
ARPAD SOMLYODY
BY Robert A. Green
ATTORNEY 2,008,067
Patented Nov. 7, 1961

3,008,067
COUNTER CIRCUIT AND COUNT INDICATOR
Arpad Somlyody, Raritan, N.J., assignor to Burroughs
Corporation, Detroit, Mich., a corporation of Michigan
Filed July 2, 1959, Ser. No. 824,582
5 Claims. (Cl. 315—168)

This invention relates to counter circuits and particularly to counter circuits of the type which utilize a counting means and a count indicating means associated therewith.

One type of counter circuit employs a multiple position magnetron beam switching tube, as the counting means, coupled to an indicator device such as a multiple cathode glow indicator tube which provides a visual indication of the counting operation of the tube. Generally, this type of counter circuit performs satisfactorily. However, under some circumstances, for example, when the counting tube is operating at extremely high speed, the response time of the indicator tube may be exceeded and all of the cathodes may glow at the same time. Thus, a useful count indication is not provided. For applications of this type, it is desirable to be able to disconnect or disable the indicator device until a count indication is required, at which time the indicator is rendered operative. It is desirable that disabling and enabling operations be performed simply and efficiently and without adversely affecting the operation of the counting tube.

Accordingly, the principles and objects of the invention are concerned with the provision of an improved counter circuit employing a multiple position counter tube and a count indicator device which may be rendered operative or inoperative in simple and efficient manner, without adversely affecting the operation of the counter tube.

In brief, the counter circuit of the invention includes an electron discharge device which is operable as a counting device and which is adapted to provide an output signal for each count executed. An indicator device is coupled to the counting device for indicating the counting operation, and means are provided for rendering the indicator device operative or inoperative at will.

More specifically, means are provided for controlling the potential applied to the indicating device. This means is operable either to provide sufficient potential to allow the indicating device to indicate the performance of the counting device or to reduce the potential to such a level that the indicating device becomes inoperative.

The invention is described in greater detail by reference to the drawing wherein.

Figure 1:
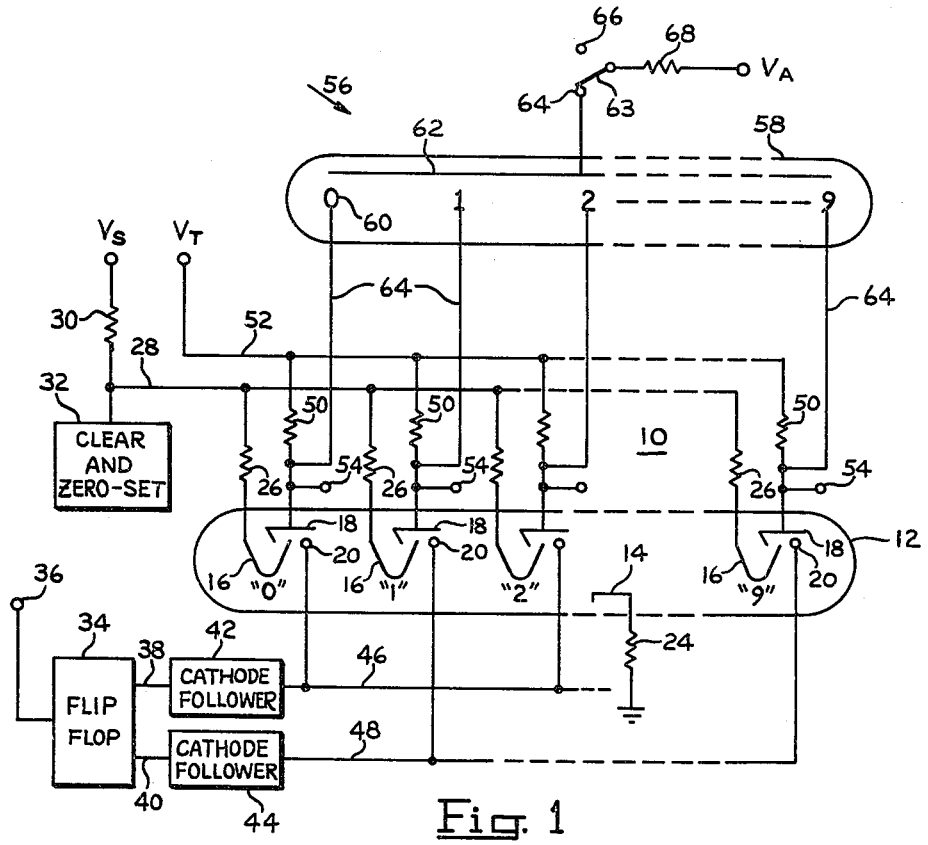
FIG. 1 is a schematic representation of a counter circuit including a counting device and an indicating device.

The circuits and systems described below are particularly suitable for use with a multi-position type 6700 magnetron beam switching tube. In actual construction, this type of tube is cylindrical in form and is shown schematically in linear form as tube 10 in FIG. 1. The tube includes an envelope 12 which contains a central longitudinally elongated cathode 14 and ten groups of electrodes spaced radially equidistantly from the cathode and surrounding the cathode. For simplicity, only four groups of electrodes are shown numbered "0," "1," "2," and "9." Each group of electrodes includes a generally U-shaped elongated spade electrode 16 and a generally L-shaped target electrode 18 positioned so that each target occupies the space between adjacent spade electrodes. Each spade electrode serves to form and hold an electron beam on its corresponding target electrode.

A generally rod-like switching electrode 20 is also included in each group of electrodes and is positioned between one edge of each target electrode and the adjacent spade electrode. The switching electrodes are known as switching grids. An open-ended cylindrical permanent magnet (not shown) is provided surrounding the tube envelope and coaxial therewith. The magnet provides an axial magnetic field which is utilized in conjunction with electric fields within the tube to form and switch an electron beam from the cathode to each of the groups of electrodes, in turn. The direction in which the beam switches, that is clockwise or counterclockwise, is always the same and is determined by the orientation of the electric and magnetic fields.

Briefly, in operation of tube 10, electrons emitted by the cathode are retained at the cathode if each of the spades, targets and switching grids carries its normal operating electrical potential. When a spade experiences a suitable lowering of its potential, an electron beam is formed and directed to the corresponding target electrode. The electron beam may be switched from one target electrode to the next by thus suitably altering the electrical potentials of a spade or switching grid. Under normal operating conditions, whenever electrode voltages are such that a beam might be supported at several positions, the beam will switch to the most leading position and lock in at this position.

In the circuit of FIG. 1, the cathode 14 is connected through a suitable bias resistor 24 to ground. Each of the spade electrodes 16 is coupled through a spade load resistor 26 to a spade buss 28. The spade buss 28 is coupled through a common spade resistor 30 to a suitable positive D.C. power supply $V_s$. A suitable zero-set circuit 32 for clearing an electron beam in the tube and resetting it at the "0" position is coupled to the spade buss 28 and the spade electrode 16 at the "0" position. A typical zero-set circuit operates by first reducing the potential of the spade buss to a level at which a beam cannot be maintained at any position and then holding the "0" spade at a lower voltage level than the other spades until a beam forms at the "0" position.

The switching grid electrodes 20 are connected to suitable means for driving the tube 10 and thus switching an electron beam from position to position. In one arrangement, the grids at the even-numbered positions are connected together in one set and the grids at the odd-numbered positions are connected together in another set. A flip-flop circuit 34 is provided having an input terminal 36 and having two output leads 38 and 40 which are connected to the inputs of cathode follower circuits 42 and 44. The cathode follower circuit 42 has its cathode output 46 connected to the even-numbered switching grids of the tube 10, and the cathode follower 44 has its cathode output 48 connected to the odd-numbered switching grids. As first one and then the other output of the flip-flop 34 operates through its cathode follower circuit, an electron beam is switched from position to position in the tube 10. If desired, the cathode followers may be omitted, and the output leads 38 and 40 of the flip-flop may be connected directly to the switching grids. However, the cathode followers provide low impedance and facilitate driving of the beam switching tube.

Each target electrode 18 of the tube 10 is connected through a suitable load resistor 50 to a common target buss 52 which is coupled to a positive D.C. power supply $V_T$ of about 300 volts. Each target electrode may also be provided with an output terminal 54 adapted to be connected to any suitable utilization circuit.

The tube 10 is coupled to an indicating device for indicating the counting operation of the tube. One type of indicating device contemplated by the present invention is a visual indicator such as the type 6844A tube.

This type of tube, shown schematically as tube 56, includes, in a gas-filled envelope 58, a plurality of indicator cathode glow electrodes 60 which are adapted to glow, and an anode electrode 62. The target electrodes 18 of tube 10 are each connected by a lead 64 to one of the cathodes of the indicator tube 56.

According to the invention, means are provided for rendering the indicator tube 56 operative or inoperative at will. According to one arrangement for achieving this operation, shown in FIG. 1, the anode 62 of the indicator tube is coupled to a two-position switch having a movable arm 63 and two terminals 64 and 66. With the arm 63 in contact with terminal 64, the anode is connected through a current limiting resistor 68 to a voltage source $V_A$ of about 400 volts. With the movable arm 63 in contact with the second terminal 66, the anode 62 is disconnected from the voltage source $V_A$ and is electrically floating.

In operation of the circuit of FIG. 1, if it is desired to disable the indicator tube 56 while the counting tube is operating, the switch arm 63 is connected to terminal 66 so that the anode 62 of the indicator tube is disconnected from source $V_A$. With this connection, insufficient voltage appears across the indicator tube 56 when an electron beam is at each counting position of tube 10 to cause a cathode 60 to glow. If at some instant it is desired to provide a visual indication of a count in the tube 10, the switch arm 63 is moved into contact with terminal 64 so that the anode 62 of tube 56 is connected to the voltage source $V_A$. With this arrangement, when an electron beam flows to one of the targets 18 in tube 10, a negative potential is applied to the corresponding cathode 60 in tube 56 through a lead 64. The difference between this negative potential and the positive potential applied to the anode 62 by source $V_A$ is sufficient to cause the particular cathode to glow and provide a visual count indication.

Figures 2, 3:
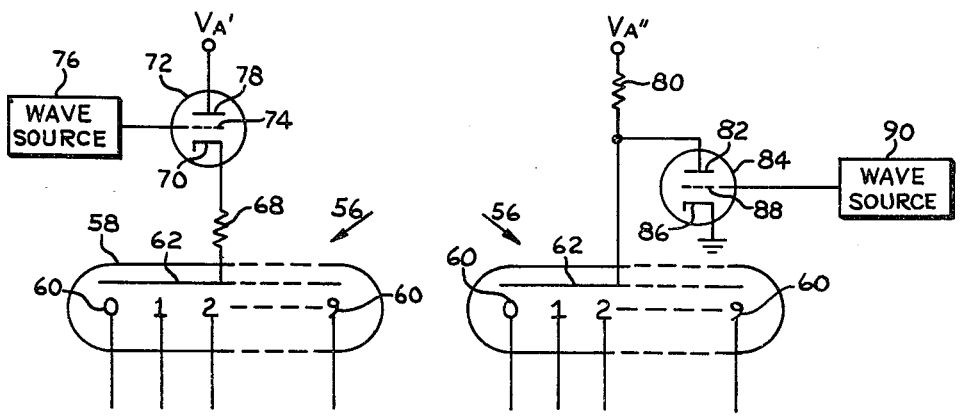
FIG. 2 is a schematic representation of a modification of a portion of the circuit of FIG. 1.
FIG. 3 is a schematic representation of another modification of a portion of the circuit of FIG. 1.

Another embodiment of the invention is shown in FIG. 2, and in this embodiment, all circuit components are the same as in FIG. 1 except for the connections of the anode 62 of the indicator tube. In FIG. 2, the anode 62 is connected through a current limiting resistor 68 to the cathode 70 of an electron tube 72. The tube 72 includes a control grid 74 which is connected to a source 76 of positive step waveforms and an anode 78 which is connected to a voltage source $V_A'$ of about 450 volts. In operation of this embodiment of the invention, with no signal applied to the grid 74 of the tube 72, the cathode 70 of the tube, and thus the anode 62 of the indicator tube 56, are at a low potential, about 300 volts, which provides insufficient voltage across the indicator tube to cause a cathode 60 to glow. If it is desired to provide a visual indication of the count by means of cathode glow, a positive step voltage is applied to the control grid 74 and the resultant current flow through the tube 72 raises the potential of the cathode 70 and the anode 62 sufficiently to cause a glow cathode 60, connected to a target 18, to glow.

In another modification of the invention, shown in FIG. 3, which, again, is identical to FIG. 1 except for the connections of the anode 62 of the indicator tube, the anode 62 is connected through a current limiting resistor 80 to a voltage source $V_A''$ of about 400 volts. The anode 62 is also connected to the anode 82 of an electron tube 84 having a cathode 86 which is connected to ground and a control grid 88 which is connected to a source 90 of positive step waveforms. In operation of the circuit of FIG. 3, with no positive voltage applied to the control grid 88, the anode 62 of the indicator tube 56 is at a sufficiently high potential to cause a cathode 60 to glow when an electron beam flows to the corresponding target 18 in the tube 10. With a positive voltage applied to the control grid 88, current flow through the tube 84 lowers the potential of the anode 82 of the tube 84 and the anode 62 of the indicator tube 56 to such a level that the potential difference across the indicator tube is insufficient to provide cathode glow.

In the embodiments of the invention shown in FIGS. 2 and 3, it is clear that the tubes 72 and 84 may be replaced by other equivalent devices such as transistors or the like. Other similar modifications may also be made, as will be obvious to those skilled in the art.

What is claimed is:

1. A counter circuit including an electron beam switching tube having a cathode and a plurality of groups of electrodes; each group including a target electrode which receives an electron beam and produces an output signal therefrom, a spade electrode which holds an electron beam on its associated target electrode, and a switching electrode which serves to switch an electron beam from one group of electrodes to the next; a gas discharge indicator tube including an anode and a plurality of glow cathodes, means interconnecting each target electrode of said beam switching tube and one of the glow cathodes of said indicator tube, an electron discharge device coupled to the anode of said indicator tube, and control means coupled to said electron discharge device for turning it off and on and thereby also turning said indicator tube off and on whereby a selective visual indication of the counting operation of said beam switching tube may be obtained.

2. The circuit defined in claim 1 wherein said electron discharge device has an electrode source of electrons, an output electrode, and a current flow control electrode, the anode of said indicating means being coupled to the electrode source of electrons of said tube, the output electrode of said tube being coupled to a power source, and the control electrode of said tube being coupled to a source of step waves, one portion of each step wave being adapted to render said discharge device non-conductive and said indicating means inoperative, and another portion of each step wave being adapted to render said discharge device conductive and said indicating means operative.

3. The circuit defined in claim 1 wherein said electron discharge device has a cathode, a control grid, and an anode, the anode of said indicating means being coupled to the cathode of said tube, the anode of said tube being coupled to a power source, and the control grid of said tube being coupled to a source of step waves, one portion of said step waves being adapted to render said tube non-conductive and said indicating means inoperative, and another portion of said step waves being adapted to render said tube conductive and said indicating means operative.

4. The circuit defined in claim 1 wherein said electron discharge device has a cathode, a control grid, and an anode, the cathode of said tube being connected to ground, the anode of said indicating means being coupled to the anode of said tube and to a power source, and the control grid of said tube being coupled to a source of step waves, one portion of each step wave being adapted to render said tube non-conductive and said indicating means inoperative, and another portion of each step wave being adapted to render said tube conductive and said indicating means operative.

5. The circuit defined in claim 1 wherein said electron discharge device has an electrode source of electrons, an output electrode, and a control electrode, said electrode source of electrons being connected to ground, the anode of said indicating means being coupled to the anode of said device and to a power source, and the control electrode of said device being coupled to a source of step waves, one portion of each step wave being adapted to render said device non-conductive and said indicating means inoperative, and another portion of each step wave being adapted to render said device conductive and said indicating means operative.

(References on following page)

References Cited in the file of this patent

UNITED STATES PATENTS

| | | |
|---|---|---|
| 2,490,562 | Van Dorsten | Dec. 6, 1949 |
| 2,618,760 | Hancock et al. | Nov. 18, 1952 |
| 2,684,440 | Wallace et al. | July 20, 1954 |
| 2,769,939 | Williams | Nov. 6, 1956 |
| 2,808,535 | Lee | Oct. 1, 1957 |
| 2,832,915 | McCoy | Apr. 29, 1958 |
| 2,871,399 | Scuitto | Jan. 27, 1959 |

FOREIGN PATENTS

| | | |
|---|---|---|
| 570,094 | Great Britain | June 21, 1945 |